(12) United States Patent
Shi

(10) Patent No.: US 11,489,648 B2
(45) Date of Patent: Nov. 1, 2022

(54) TIMER-BASED BANDWIDTH PART SWITCHING METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Cong Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 241 days.

(21) Appl. No.: 16/933,897

(22) Filed: Jul. 20, 2020

(65) Prior Publication Data

US 2020/0351064 A1 Nov. 5, 2020

Related U.S. Application Data

(63) Continuation of application No. PCT/CN2018/073516, filed on Jan. 19, 2018.

(51) Int. Cl.
*H04L 5/00* (2006.01)
*H04W 76/11* (2018.01)
(Continued)

(52) U.S. Cl.
CPC .......... *H04L 5/0082* (2013.01); *H04L 1/1819* (2013.01); *H04L 5/0092* (2013.01);
(Continued)

(58) Field of Classification Search
None
See application file for complete search history.

(56) References Cited

U.S. PATENT DOCUMENTS

2019/0149308 A1* 5/2019 Son .................. H04L 5/0007
375/260
2019/0149421 A1* 5/2019 Jin .................... H04W 36/125
370/331

(Continued)

FOREIGN PATENT DOCUMENTS

| CN | 102355334 | 2/2012 |
| EP | 2595425 | 5/2013 |
| EP | 3720196 | 10/2020 |

OTHER PUBLICATIONS

"3rd Generation Partnership Project; Technical Specification Group Radio Access Network; NR; Medium Access Control (MAC) protocol specification (Release 15)," 3GPP TS 38.321, V15.0.0, Dec. 2017, 55 pages.

(Continued)

*Primary Examiner* — Saumit Shah
(74) *Attorney, Agent, or Firm* — Hodgson Russ LLP

(57) ABSTRACT

Provided are a timer-based bandwidth part (BWP) switching method, a terminal device, and a network device. The method is applied to a terminal device. A BWP and a non-dynamic scheduling resource are configured for the current serving cell of the terminal device, and a BWP deactivation timer is configured for the currently activated BWP. The method includes: after receiving indication information, the terminal device determines whether to stop, start, or adjust the BWP deactivation timer, the indication information being used for indicating that the terminal device activates or deactivates the non-dynamic scheduling resource.

14 Claims, 2 Drawing Sheets

(51) Int. Cl.
  *H04W 76/27* (2018.01)
  *H04L 1/18* (2006.01)
  *H04W 72/04* (2009.01)
  *H04W 72/12* (2009.01)

(52) U.S. Cl.
  CPC ....... *H04L 5/0098* (2013.01); *H04W 72/0453* (2013.01); *H04W 72/1257* (2013.01); *H04W 76/11* (2018.02); *H04W 76/27* (2018.02)

(56) References Cited

U.S. PATENT DOCUMENTS

| | | | | |
|---|---|---|---|---|
| 2019/0200396 | A1* | 6/2019 | Agiwal | H04W 28/20 |
| 2019/0215900 | A1* | 7/2019 | Pan | H04L 27/2666 |
| 2020/0374799 | A1* | 11/2020 | Kuang | H04W 52/0216 |

OTHER PUBLICATIONS

Mediatek Inc., "Remaining Details on Bandwidth Part Operation in NR," 3GPP TSG RAN WG1 Meeting 91, R1-1719551, Dec. 2017, 10 pages.

NTT Docomo, Inc., "Remaining issues on bandwidth parts for NR," 3GPP TSG RAN WG1 Meeting 90bis, R1-1718223, Oct. 2017, 4 pages.

WIPO, ISR for PCT/CN2018/073516, Oct. 12, 2018.

EPO, Extended European Search Report for EP Application No. 18901155.4, dated Nov. 23, 2020.

LG Electronics Inc., "TP for BWP," 3GPP TSG-RAN WG2 Meeting #100, Draft R2-1714046, Nov. 2017, 5 pages.

Huawei et al., "Stage 3 CR on SPS-Config in 38.331 (H081, H243-H249)," 3GPP TSG-RAN WG2 NR Ad hoc 0118, R2-1800480, Jan. 2018, 9 pages.

Asustek, "Remaining issues on BWP inactivity timer," 3GPP TSG-RAN WG2 Meeting #AH-1801, R2-1800044, Jan. 2018, 7 pages.

"3rd Generation Partnership Project; Technical Specification Group Radio Access Network; NR; Medium Access Control (MAC) protocol specification (Release 15)," 3GPP TS 38.321, Dec. 2017, v2.0.0, 55 pages.

ETSI MCC, "Report of 3GPP TSG RAN2#100 meeting, Reno, Nevada, USA," 3GPP TSG-RAN WG2 meeting #101, R2-1801701, Feb. 2018, 212 pages.

* cited by examiner

TIMER-BASED BANDWIDTH PART SWITCHING METHOD, TERMINAL DEVICE, AND NETWORK DEVICE

CROSS-REFERENCE TO RELATED APPLICATION

This application is a continuation application of International Application No. PCT/CN2018/073516, filed Jan. 19, 2018, the entire disclosure of which is incorporated herein by reference.

TECHNICAL FIELD

Embodiments of the present invention relate to the field of communications, and more specifically, to a timer-based bandwidth part switching method, a terminal device, and a network device.

BACKGROUND

In the 100th meeting of the 3rd Generation Partnership Project (3GPP) Radio Access Network (RAN) 2, a timer for deactivating bandwidth part (Bandwidth Part timer, BWP timer) was introduced at a Media Access Control (MAC) layer. The BWP timer can be configured for each non-default downlink BWP, to switch a UE from a currently activated non-default BWP to a default BWP or an initial BWP, thereby saving energy consumption. Specifically, regarding a behavior of the BWP timer, a current MAC protocol (TS 38.321) provides as follows.

Start or restart condition: receiving a Physical Downlink Control Channel (PDCCH) for scheduling downlink allocation, or receiving a PDCCH for switching of a BWP.

Stop condition: starting a Random Access process.

Time-out behavior: switching a currently activated BWP to a default downstream BWP, or an initial BWP.

In addition, the RAN2 #100 meeting also provided that: Semi-Persistent Scheduling (SPS) may be configured by Radio Resource Control (RRC) with some basic parameters (for example, cycle), and then activates or deactivates a SPS resource through a SPS-RNTI PDCCH. Only after activation, a User Equipment (UE) can receive downlink transmission on the SPS resource. However, during switching of a currently activated downlink BWP, from the MAC's perspective, a corresponding SPS resource needs to be cleared.

SUMMARY

Provided are a timer-based Bandwidth Part (BWP) switching method, a terminal device and a network device.

In a first aspect, a timer-based Bandwidth Part (BWP) switching method is provided, which is applied to a terminal device. A BWP and a non-dynamic scheduling resource are configured for a current serving cell of the terminal device, and a BWP deactivation timer is configured for a currently activated BWP;

the method includes:

after receiving indication information, the terminal device determines whether to stop, start, or adjust the BWP deactivation timer, the indication information being used for indicating that the terminal device activates or deactivates the non-dynamic scheduling resource.

In the embodiments of the present application, after receiving the indication information used for indicating that the terminal device activates or deactivates the non-dynamic scheduling resource, the terminal device determines whether to stop, start, or adjust the BWP deactivation timer, so that the problem of data transmission interruption during switching of the BWP can be avoided.

In some possible implementations, the after receiving the indication information, the terminal device determines whether to stop, start, or adjust the BWP deactivation timer, includes:

after receiving a Physical Downlink Control Channel (PDCCH) scrambled using a Configured Scheduling-Radio Network Temporary Identifier CS-RNTI, the terminal device determines whether to stop, start, or adjust the BWP deactivation timer, wherein the PDCCH is used for indicating that the terminal device activates or deactivates the non-dynamic scheduling resource.

In some possible implementations, the after receiving the indication information, the terminal device determines whether to stop, start, or adjust the BWP deactivation timer, includes:

after receiving a Radio Resource Control (RRC) re-configuration message, the terminal device determines whether to stop, start, or adjust the BWP deactivation timer, wherein the RRC re-configuration message includes the indication information.

In some possible implementations, the determining whether to stop, start, or adjust the BWP deactivation timer, includes:

determining to stop or adjust the BWP deactivation timer, in a case where the terminal device meets a first condition, wherein the first condition is a criterion used by the terminal device to determine whether to stop or adjust the BWP deactivation timer after acquiring the indication information.

In some possible implementations, the determining to stop or adjust the BWP deactivation timer, in the case where the terminal device meets the first condition, includes:

determining to stop or adjust the BWP deactivation timer, in a case where the terminal device determines that the indication information is used for indicating that the terminal device activates the non-dynamic scheduling resource.

In some possible implementations, the determining to stop or adjust the BWP deactivation timer, in the case where the terminal device determines that the indication information is used for indicating that the terminal device activates the non-dynamic scheduling resource, includes:

determining to stop or adjust the BWP deactivation timer, in a case where the terminal device determines that a New Data Index (NDI) in hybrid automatic repeat request (HARQ) information of the PDCCH is 0, and the indication information is used for indicating that the terminal device activates the non-dynamic scheduling resource.

In some possible implementations, the determining whether to stop, start, or adjust the BWP deactivation timer, includes:

determining to start, restart, or adjust the BWP deactivation timer, in a case where the terminal device meets a second condition, wherein the second condition is a criterion used by the terminal device to determine whether to start, restart, or adjust the BWP deactivation timer after acquiring the indication information.

In some possible implementations, the determining to start, restart, or adjust the BWP deactivation timer, in the case where the terminal device meets the second condition, includes:

determining to start, restart, or adjust the BWP deactivation timer, in a case where the terminal device determines that the indication information is used for indicating that the terminal device deactivates the non-dynamic scheduling resource.

In some possible implementations, the determining to start, restart, or adjust the BWP deactivation timer, in the case where the terminal device determines that the indication information is used for indicating that the terminal device deactivates the non-dynamic scheduling resource, includes:

starting, or restarting the BWP deactivation timer, in a case where the terminal device determines that the New Data Index (NDI) in the Hybrid Automatic Repeat Request (HARQ) information of the PDCCH is 0, and the indication information is used for indicating that the terminal device deactivates the non-dynamic scheduling resource.

In some possible implementations, the non-dynamic scheduling resource includes at least one of following:

a downlink non-dynamic scheduling resource on a paired spectrum, a downlink non-dynamic scheduling resource on a non-paired spectrum, and an uplink non-dynamic scheduling resource on the non-paired spectrum.

In some possible implementations, a default BWP is configured for the terminal device, and the currently activated BWP is a non-default BWP.

In some possible implementations, a default BWP is not configured for the terminal device, and the currently activated BWP is a non-initial BWP.

In a second aspect, a timer-based Bandwidth Part (BWP) switching method is provided, including:

generating, by a network device, indication information, the indication information being used for indicating that the terminal device activates or deactivates a non-dynamic scheduling resource configured for a current serving cell of the terminal device;

sending, by the network device, the indication information to the terminal device.

In some possible implementations, the sending, by the network device, the indication information to the terminal device, includes:

sending, by the network device, a Physical Downlink Control Channel (PDCCH) scrambled using a Configured Scheduling-Radio Network Temporary Identifier (CS-RNTI) to the terminal device, wherein the PDCCH is used for indicating that the terminal device activates or deactivates the non-dynamic scheduling resource.

In some possible implementations, the sending, by the network device, the indication information to the terminal device, includes:

sending, by the network device, a Radio Resource Control (RRC) re-configuration message to the terminal device, wherein the RRC re-configuration message includes the indication information.

In some possible implementations, the non-dynamic scheduling resource includes at least one of following:

a downlink non-dynamic scheduling resource on a paired spectrum, a downlink non-dynamic scheduling resource on a non-paired spectrum, and an uplink non-dynamic scheduling resource on the non-paired spectrum.

In some possible implementations, a default BWP is configured for the terminal device, and the currently activated BWP is a non-default BWP.

In some possible implementations, the default BWP is not configured for the terminal device, and the currently activated BWP is a non-initial BWP.

In a third aspect, a terminal device is provided, wherein a BWP and a non-dynamic scheduling resource are configured for a current serving cell of the terminal device, and a BWP deactivation timer is configured for a currently activated BWP;

the terminal device includes:

a receiving unit, configured to receive indication information;

a processing unit, configured to determine whether to stop, start or adjust the BWP deactivation timer, after receiving the indication information by the receiving unit, the indication information being used for indicating that the terminal device activates or deactivates the non-dynamic scheduling resource.

In a fourth aspect, a terminal device is provided, wherein a BWP and a non-dynamic scheduling resource are configured for a current serving cell of the terminal device, and a BWP deactivation timer is configured for a currently activated BWP;

the terminal device includes:

a transceiver, configured to receive indication information;

a processor, configured to determine whether to stop, start or adjust the BWP deactivation timer, after receiving the indication information by the receiving unit, the indication information being used for indicating that the terminal device activates or deactivates the non-dynamic scheduling resource.

In a fifth aspect, a network device is provided, including:

a generating unit, configured to generate indication information the indication information being used for indicating that a terminal device activates or deactivates a non-dynamic scheduling resource configured for a current serving cell of the terminal device;

a sending unit, configured to send the indication information to the terminal device.

In a sixth aspect, a network device is provided, including:

a transceiver, configured to generate indication information used for indicating that a terminal device activates or deactivates a non-dynamic scheduling resource configured for a current serving cell of the terminal device;

a processor, configured to send the indication information to the terminal device.

In a seventh aspect, a computer-readable medium is provided for storing a computer program, the computer program including indications for performing the method embodiment of the first aspect or the second aspect described above.

In an eighth aspect, a computer chip is provided, including: an input interface, an output interface, at least one processor, and a memory, wherein the processor is used to execute code in the memory, and when the code is executed, the processor may implement various processes in the timer-based Bandwidth Part (BWP) switching method performed by the terminal device in the first aspect described above.

In a ninth aspect, a computer chip is provided, including: an input interface, an output interface, at least one processor, and a memory, wherein the processor is used to execute code in the memory, and when the code is executed, the processor may implement various processes in the timer-based Bandwidth Part (BWP) switching method performed by the network device in the second aspect described above.

In a tenth aspect, a communication system is provided, including the foregoing terminal device and network device.

DETAILED DESCRIPTION

Figure 1:
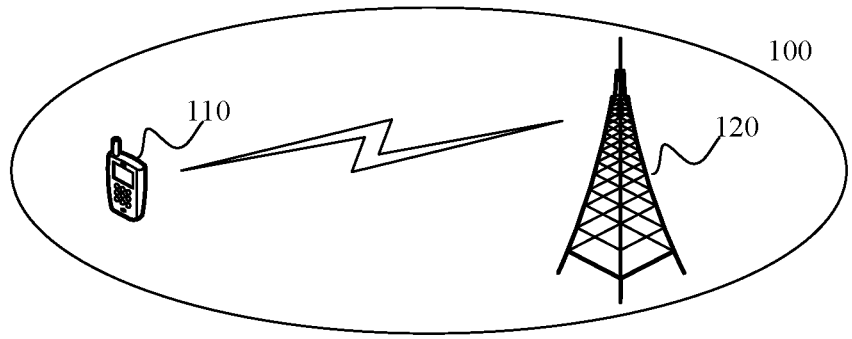
FIG. 1 is an example of an application scenario of the present application.

FIG. 1 is a schematic diagram of an application scenario of an embodiment of the present application.

As shown in FIG. 1, a communication system 100 may include a terminal device 110 and a network device 120. The network device 120 may communicate with the terminal device 110 through an air interface. Multi-service transmission is supported between the terminal device 110 and the network device 120.

It should be understood that the embodiments of the present application are only exemplarily described with the communication system 100, but the embodiments of the present application are not limited thereto. That is, the technical solutions of the embodiments of the present application can be applied to various communication systems, such as: Long Term Evolution (LTE) system, LTE Time Division Duplex (TDD), Universal Mobile Telecommunication System (UMTS), etc. For ease of description, in the following, the embodiments of the present application take a 5-Generation (5G) mobile communication technology New Radio (NR) communication system as an example for description.

This application describes various embodiments in combination with the network device and the terminal device.

The network device 120 may refer to any entity used to send or receive signals on a network side. For example, it may be user equipment of machine type communication (MTC), Evolutional Node B (eNB or eNodeB) in LTE, base station equipment in 5G network, etc.

In addition, the terminal device 110 may be any terminal device. Specifically, the terminal device 110 may communicate with one or more core networks via a Radio Access Network (RAN), and may also be called an access terminal, a user equipment (UE), a user unit, a user station, a mobile station, a moving station, a remote station, a remote terminal, a mobile device, a user terminal, a terminal, a wireless communication device, a user agent, or a user device. For example, it may be a cellular phone, a cordless phone, a Session Initiation Protocol (SIP) phone, a Wireless Local Loop (WLL) station, a Personal Digital Assistant (PDA), a handheld device with wireless communication function, a computing device, or other processing devices connected to wireless modems, in-vehicle devices, wearable devices, and terminal devices in 5G networks.

It should be understood that the BWP may be configured for a serving cell, and one serving cell may be configured with a maximum of 4 downlink BWPs and a maximum of 4 uplink BWPs.

Further, in the embodiment of the present application, the BWP and the non-dynamic scheduling resource are configured for the current serving cell of the terminal device, and the BWP deactivation timer is configured for the currently activated BWP. It should be understood that the BWP deactivation timer can be configured for each non-default downlink BWP, to switch the UE from a currently activated non-default BWP to a default BWP or an initial BWP, thereby saving energy consumption.

Specifically, regarding the behavior of a BWP timer, a current MAC protocol (TS 38.321) provides as follows:

Start or restart condition: receiving a Physical Downlink Control Channel (PDCCH) for scheduling downlink allocation, or receiving a PDCCH for switching of the BWP.

Stop condition: starting a random access process.

Time-out behavior: switching a currently activated BWP to a default downlink BWP, or an initial BWP.

In addition, the current serving cell of the terminal device 110 may be configured with the non-dynamic scheduling resource.

It should be understood that the non-dynamic scheduling resource may include a downlink semi-persistent scheduling (SPS) resource and an uplink configured grant resource, wherein the uplink configured grant includes a type 1 configured grant resource and a type 2 configured grant resource. The difference is that the type 1 configured grant is purely configured by RRC, the type 2 configured grant is configured for a period by RRC, and other time-frequency domain resources are indicated by Downlink Control Information (DCI), and also support DCI activation and deactivation.

For the Semi-Persistent Scheduling (SPS) resource, an RRC configuration can be based on the BWP, that is, if a terminal has n downlink BWPs in a serving cell, in theory, each of the downlink BWPs may have a corresponding SPS RRC configuration.

Specifically, the Semi-Persistent Scheduling (SPS) can be configured by Radio Resource Control (RRC) with some basic parameters (for example, period), and then, the SPS resource is activated or deactivated by a PDCCH of Configured Scheduling-Radio Network Temporary Identifier (CS-RNTI). Only after activation, the user equipment (UE) can receive downlink transmission on the SPS resource.

However, when the currently activated downlink BWP is switched, from MAC's perspective, the corresponding SPS resource needs to be cleared.

It can be found from this that if a BWP timer times out after activating SPS resource, a UE will switch to a default downlink BWP or an initial BWP, so that SPS transmission on a previously activated downlink BWP will be interrupted.

Therefore, in the embodiment of the present application, a timer-based bandwidth part switching method is proposed, which can solve the problem of data transmission interruption during switching of the BWP.

Figure 2:
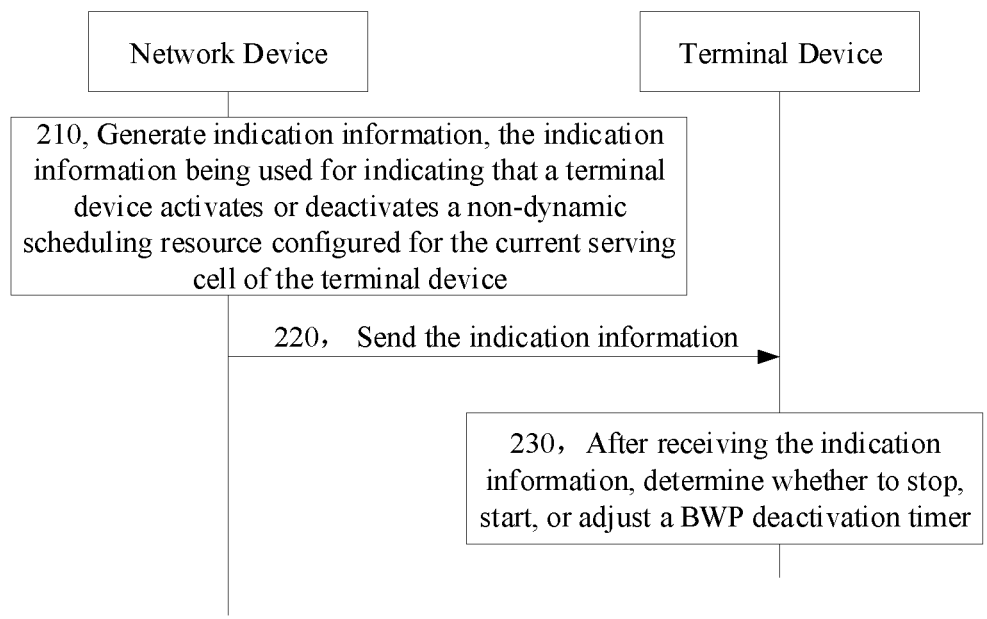
FIG. 2 is a schematic flowchart of a timer-based bandwidth part switching method according to an embodiment of the present application.

FIG. 2 is a schematic flowchart of a timer-based Bandwidth Part (BWP) switching method according to an embodiment of the present application.

Specifically, as shown in FIG. 2, the method includes:

Step 210, generating, by a network device, indication information, the indication information being used for indicating that a terminal device activates or deactivates a non-dynamic scheduling resource configured for the current serving cell of the terminal device.

Step 220, sending, by the network, the indication information to the terminal device.

Step 230, after receiving the indication information, determining, by the terminal device, whether to stop, start, or adjust a BWP deactivation timer Briefly, the network device generates the indication information, and the network device sends the indication information to the terminal device. Therefore, after receiving the indication information, the terminal device determines whether to stop, start, or adjust the BWP deactivation timer.

It should be understood that the timer-based bandwidth part switching method according to an embodiment of the present application may be applied to a terminal device. A BWP and a non-dynamic scheduling resource are configured for the current serving cell of the terminal device, and a BWP deactivation timer is configured for a currently activated BWP.

It can be found that in the embodiment of the present application, after receiving indication information, the terminal device determines whether to stop, start, or adjust the BWP deactivation timer, the indication information being used for indicating that the terminal device activates or deactivates the non-dynamic scheduling resource configured for the current serving cell of the terminal device, which can avoid the problem of data transmission interruption during switching of the BWP.

Hereinafter, the indication information in the embodiments of the present application is described by way of example:

In an embodiment, after receiving a PDCCH scrambled using a CS-RNTI, the terminal device determines whether to stop, start, or adjust the BWP deactivation timer, where the PDCCH is used for indicating that the terminal device activates or deactivates the non-dynamic scheduling resource. In other words, the network device sends the PDCCH scrambled using the CS-RNTI to the terminal device.

In another embodiment, after receiving an RRC re-configuration message, the terminal device determines whether to stop, start, or adjust the BWP deactivation timer, wherein the RRC re-configuration message includes the indication information. In other words, the network device sends a RRC re-configuration message to the terminal device.

It should be understood that the format of the indication information in the above-mentioned embodiments is merely an exemplary description, and the embodiments of the present application are not limited thereto.

The following describes the implementation manner of determining whether to stop, start or adjust the BWP deactivation timer after the terminal device receives the indication information in the embodiment of the present application:

Optionally, when meeting a first condition, the terminal device determines to stop or adjust the BWP deactivation timer. The first condition is a criterion used by the terminal device to determine whether to stop or adjust the BWP deactivation timer after acquiring the indication information.

For example, when determining that the indication information is used for indicating that the terminal device activates the non-dynamic scheduling resource, the terminal device determines to stop or adjust the BWP deactivation timer.

Further, when determining that a new data indicator (NDI) in hybrid automatic repeat request (HARQ) information of the PDCCH is 0, and the indication information is used for indicating that the terminal device activates the non-dynamic scheduling resource, the terminal device determines to stop or adjust the BWP to deactivate the timer.

Optionally, when meeting a second condition, the terminal device determines to start, restart, or adjust the BWP deactivation timer. The second condition is a criterion used by the terminal device to determine whether to start, restart, or adjust the BWP deactivation timer after acquiring the indication information.

For example, when determining that the indication information is used for indicating that the terminal device deactivates the non-dynamic scheduling resource, the terminal device determines to start, restart, or adjust the BWP deactivation timer.

Further, when determining that the New Data Indicator (NDI) in the HARQ information of the PDCCH is 0, and the indication information is used for indicating that the terminal device deactivates the non-dynamic scheduling resource, the terminal device starts or restarts the BWP deactivation timer.

It should be understood that the non-dynamic scheduling resource includes at least one of the following:

a downlink non-dynamic scheduling resource on a paired spectrum, a downlink non-dynamic scheduling resource on a non-paired spectrum, and an uplink non-dynamic scheduling resource on the non-paired spectrum.

For example, for the paired spectrum (for example, Frequency Division Dual (FDD) spectrum), the indication information is used to indicating that the terminal device activates the non-dynamic scheduling resource, and the non-dynamic scheduling resource refers to the downlink non-dynamic scheduling resource.

For another example, for the non-paired spectrum (for example, Time Division Duplexing (TDD) spectrum), the indication information is used to indicating that the terminal device activates the non-dynamic scheduling resource, and the non-dynamic scheduling resource refers to the downlink non-dynamic scheduling resource or the uplink non-dynamic scheduling resource.

For another example, for the paired spectrum (for example, FDD spectrum), the indication information is used to indicating that the terminal device deactivates the non-dynamic scheduling resource, and the non-dynamic scheduling resource refers to the downlink non-dynamic scheduling resource.

For another example, for the non-paired spectrum (for example, TDD spectrum), the indication information is used for indicating the terminal device deactivates the non-dynamic scheduling resource, and the non-dynamic scheduling resource refers to the downlink non-dynamic scheduling resource or the uplink non-dynamic scheduling resource.

It should be understood that, in the embodiments of the present application, the first condition and the second condition mentioned above are only exemplary descriptions, and the embodiments of the present application are not limited thereto.

For example, in the embodiment of the present application, the terminal device may also be configured with a default BWP. Therefore, the first condition and the second condition may further include that the terminal device currently meets that the currently activated BWP of the terminal device is a non-default BWP.

For another example, the terminal device may not be configured with the default BWP, and thus, the first condition and the second condition may further include that the terminal device currently meets that the currently activated BWP of the terminal device is a non-initial BWP.

Figure 3:
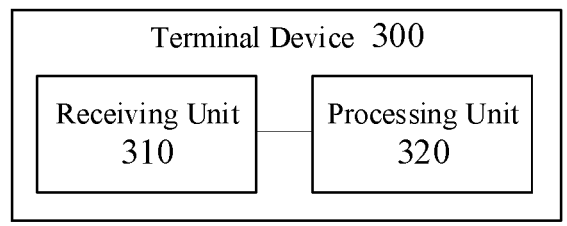
FIG. 3 is a schematic block diagram of a terminal device according to an embodiment of the present application.

FIG. 3 is a schematic block diagram of a terminal device 300 according to an embodiment of the present application. It should be understood that a BWP and a non-dynamic scheduling resource are configured for a current serving cell of the terminal device, and a BWP deactivation timer is configured for a currently activated BWP.

Specifically, as shown in FIG. 3, the terminal device 300 includes:

a receiving unit 310, configured to receive indication information; and a processing unit 320, configured to determine, by the receiving unit 310, whether to stop, start or adjust the BWP deactivation timer after receiving the indication information, the indication information being used for indicating that the terminal device activates or deactivates the non-dynamic scheduling resource.

Optionally, the processing unit 320 is specifically configured to:

after receiving a Physical Downlink Control Channel (PDCCH) scrambled using a Configured Scheduling-Radio Network Temporary Identifier (CS-RNTI) by the receiving unit 310, determine whether to stop, start, or adjust the BWP deactivation timer, wherein the PDCCH is used for indicating that the terminal device activates or deactivates the non-dynamic scheduling resource.

Optionally, the processing unit 320 is specifically configured to:

after receiving a radio resource control (RRC) re-configuration message by the receiving unit 310, determine whether to stop, start, or adjust the BWP deactivation timer, wherein the RRC re-configuration message includes the indication information.

Optionally, the processing unit 320 is more specifically configured to:

determine to stop or adjust the BWP deactivation timer, when meeting a first condition, wherein the first condition is a criterion used by the terminal device to determine whether to stop or adjust the BWP deactivation timer after acquiring the indication information.

Optionally, the processing unit 320 is more specifically configured to:

determine to stop or adjust the BWP deactivation timer, when the indication information is used for indicating that the terminal device activates the non-dynamic scheduling resource.

Optionally, the processing unit 320 is more specifically configured to:

determine to stop or adjust the BWP deactivation timer, when determining that a new data index (NDI) in hybrid automatic repeat request (HARQ) information of the PDCCH is 0, and the indication information is used for indicating that the terminal device activates the non-dynamic scheduling resource.

Optionally, the processing unit 320 is more specifically configured to:

determine to start, restart, or adjust the BWP deactivation timer, when meeting a second condition, wherein the second condition is a criterion used by the terminal device to determine whether to start, restart, or adjust the BWP deactivation timer after acquiring the indication information.

Optionally, the processing unit 320 is more specifically configured to:

determine to start, restart, or adjust the BWP deactivation timer, when determining that the indication information is used for indicating that the terminal device deactivates the non-dynamic scheduling resource.

Optionally, the processing unit 320 is more specifically configured to:

start or restart the BWP deactivation timer, when determining that the NDI in the HARQ information of the PDCCH is 0, and the indication information is used for indicating that the terminal device deactivates the non-dynamic scheduling resource.

Optionally, the non-dynamic scheduling resource includes at least one of the following:

a downlink non-dynamic scheduling resource on a paired spectrum, a downlink non-dynamic scheduling resource on a non-paired spectrum, and an uplink non-dynamic scheduling resource on the non-paired spectrum.

Optionally, the terminal device is configured with a default BWP, and the currently activated BWP is a non-default BWP.

Optionally, the terminal device is not configured with the default BWP, and the currently activated BWP is a non-initial BWP.

Figure 4:
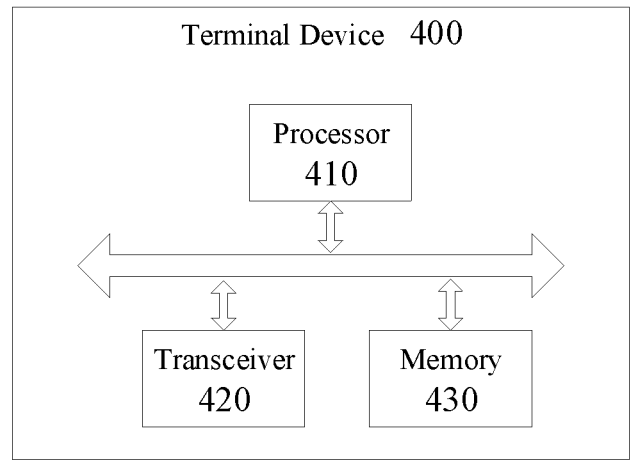
FIG. 4 is a schematic block diagram of another terminal device according to an embodiment of the present application.

In the embodiment of the present application, the receiving unit 310 may be implemented by a transceiver, and the processing unit 320 may be implemented by a processor. As shown in FIG. 4, a terminal device 400 may include a processor 410, a transceiver 420 and a memory 430. The memory 430 may be configured to store indication information, and may also be configured to store codes and instructions executed by the processor 410. Each component in the terminal device 400 is connected through a bus system, wherein the bus system includes a power bus, a control bus, and a status signal bus in addition to the data bus.

The terminal device 400 shown in FIG. 4 can implement various processes implemented by the terminal device in the foregoing method embodiment of FIG. 2. To avoid repetition, details are not described here. That is, the method embodiments in the embodiments of the present application may be implemented by a processor and a transceiver.

Figure 5:
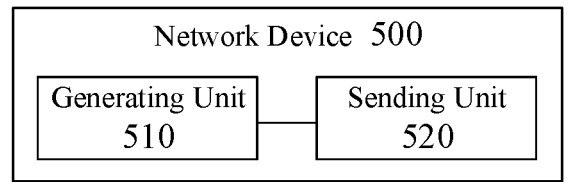
FIG. 5 is a schematic block diagram of a network device according to an embodiment of the present application.

FIG. 5 is a schematic block diagram of a network device 500 according to an embodiment of the present application.

Specifically, as shown in FIG. 5, the network device 500 includes:

a generating unit 510, configured to generate indication information, the indication information being used for indicating that the terminal device activates or deactivates a non-dynamic scheduling resource configured for a current serving cell of the terminal device; and a sending unit 520, configured to send the indication information to the terminal device.

Optionally, the sending unit 520 is specifically configured to:

send a physical downlink control channel (PDCCH) scrambled using a Configured Scheduling-Radio Network Temporary Identifier (CS-RNTI) to the terminal device, and the PDCCH is used for indicating that the terminal device activates or deactivates the non-dynamic scheduling resource.

Optionally, the sending unit 520 is specifically configured to:

send a (radio resource control) RRC re-configuration message to the terminal device, wherein the RRC re-configuration message includes the indication information.

Optionally, the non-dynamic scheduling resource includes at least one of the following:

a downlink non-dynamic scheduling resource on a paired spectrum, a downlink non-dynamic scheduling resource on the non-paired spectrum, and an uplink non-dynamic scheduling resource on the non-paired spectrum.

Optionally, the terminal device is configured with a default BWP, and a currently activated BWP is a non-default BWP.

Optionally, the terminal device is not configured with the default BWP, and the currently activated BWP is a non-initial BWP.

Figure 6:
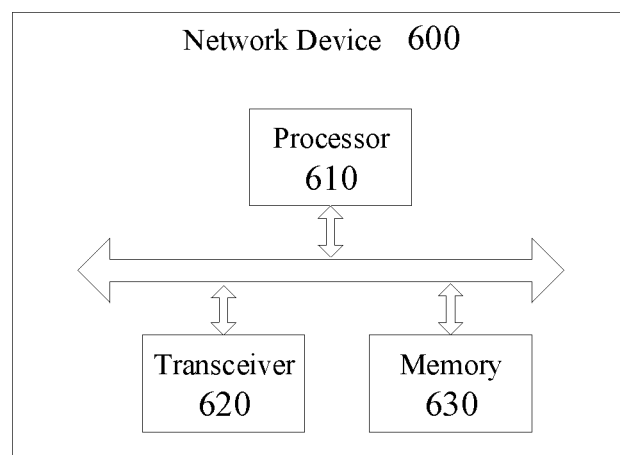
FIG. 6 is a schematic block diagram of another network device according to an embodiment of the present application.

In the embodiment of the present application, the generating unit 510 may be implemented by a processor, and the sending unit 520 may be implemented by a transceiver. As shown in FIG. 6, a network device 600 may include a processor 610, a transceiver 620 and a memory 630. The memory 630 may be configured to store indicating information, and may also be used to store codes and instructions executed by the processor 610. The various components in the network device 600 are connected by a bus system, wherein the bus system includes a power bus, a control bus, and a status signal bus in addition to the data bus.

The network device 600 shown in FIG. 6 can implement various processes implemented by the network device in the foregoing method embodiment of FIG. 2. To avoid repetition, details are not described here. That is, the method embodiments in the embodiments of the present application may be implemented by a processor and a transceiver.

In the implementation process, each step of the method embodiment in the embodiments of the present application may be completed by an integrated logic circuit of hardware in the processor or instructions in the form of software. More specifically, the steps of the method disclosed in conjunction with the embodiments of the present application may be directly embodied and executed by a hardware decoding processor, or may be executed and completed by a combination of hardware and software modules in the decoding processor. The software module may be located in a mature storage medium in the art, such as a random access memory, a flash memory, a read-only memory, a programmable read-only memory, an electrically erasable programmable memory, and a register. The storage medium is located in the memory, and the processor reads the information in the memory and completes the steps of the above method in combination with its hardware.

It should be understood that the processor mentioned in the embodiments of the present application may be an integrated circuit chip with signal processing capabilities, and may implement or execute the methods, steps, and logical block diagrams disclosed in the embodiments of the present application. For example, the foregoing processor may be a general-purpose processor, a digital signal processor (DSP), an application specific integrated circuit (ASIC), a field programmable gate array (FPGA), or other programmable logic devices, transistor logic devices, discrete hardware components, etc. In addition, the general-purpose processor may be a microprocessor or the processor may be any conventional processor or the like.

In addition, the memory mentioned in the embodiments of the present application may be a volatile memory or a non-volatile memory, or may include both volatile and non-volatile memory. Wherein, the non-volatile memory can be a Read-Only Memory (ROM), a Programmable ROM (PROM), an Erasable PROM (EPROM), an Electronically EPROM (EEPROM) or flash memory. The volatile memory may be a Random Access Memory (RAM), which is used as an external cache. It should be understood that the foregoing memory is exemplary but not limiting, for example, the memory in the embodiments of the present application may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM) and a Direct Rambus RAM (DR RAM), etc. That is, the memories of the systems and methods described herein are intended to include, but are not limited to these and any other suitable types of memories.

Finally, it should be noted that the terms used in the embodiments of the present application and the appended claims are only for the purpose of describing specific embodiments, and are not intended to limit the embodiments of the present application.

For example, the singular forms "a", "said", "above", and "the" used in the embodiments of the present application and the appended claims are also intended to include most forms unless the context clearly indicates other meaning.

For another example, depending on the context, the word "at" when used herein may be interpreted as "if" or "as if" or "when . . . " or "in response to determine" or "in response to detect". Similarly, depending on the context, the phrases "if determined" or "if detected (stated condition or event)" may be interpreted as "when determined" or "in response to determine" or "when detected (stated condition or event)" or "in response to detect (stated condition or event)".

Those of ordinary skill in the art may realize that the units and algorithm steps of the examples described in conjunction with the embodiments disclosed herein can be implemented by electronic hardware, or a combination of computer software and electronic hardware. Whether these functions are executed in hardware or software depends on the specific application of the technical solution and design constraints. Professional technicians can use different methods to implement the described functions for each specific application, but such implementation should not be considered beyond the scope of the embodiments of the present application.

Those skilled in the art can clearly understand that, for the convenience and brevity of description, the specific working processes of the systems, devices, and units described above can refer to the corresponding processes in the foregoing method embodiments, and are not repeated here.

In the several embodiments provided in this application, it should be understood that the disclosed system, device, and method may be implemented in other ways. For example, the device embodiments described above are only schematic. For example, the division of the unit is only a logical function division, and there may be other divisions in actual implementation, for example, multiple units or components may be combined or integrated into another system, or some features can be ignored or not implemented. In addition, the displayed or discussed mutual coupling or direct coupling or communication connection may be indirect coupling or communication connection through some interfaces, devices or units, and may be in electrical, mechanical or other forms.

The units described as separate components may or may not be physically separated, and the components displayed as units may or may not be physical units, that is, they may be located in one place or may be distributed on multiple network units. Some or all of the units may be selected according to actual needs to achieve the objectives of the embodiments of the present application.

In addition, the functional units in the embodiments of the present application may be integrated into one processing unit, or each unit may exist alone physically, or two or more units may be integrated into one unit.

If implemented in the form of a software functional unit and sold or used as an independent product, it can be stored in a computer-readable storage medium. Based on such an understanding, the technical solutions of the embodiments of the present application may essentially be a part that contributes to the existing technology or a part of the technical solution may be embodied in the form of a software product, and the computer software product is stored in a storage medium, Including several instructions to enable a computer device (which may be a personal computer, server, or network device, etc.) to perform all or part of the steps of the method described in the embodiments of the present application. The foregoing storage media include various media that can store program codes, such as a U disk, a mobile hard disk, a read-only memory, a random access memory, a magnetic disk, or an optical disk.

The above content is only a specific implementation manner of the embodiments of the present application, but the scope of protection of the embodiments of the present application is not limited to this, and any person skilled in the art can easily think of changes or replacements within the technical scope disclosed in the embodiments of the present application, which should be covered by the protection scope of the embodiments of the present application. Therefore, the protection scope of the embodiments of the present application shall be subject to the protection scope of the claims.

What is claimed is:

1. A method for timer-based Bandwidth Part (BWP) switching applied to a terminal device, a BWP and a non-dynamic scheduling resource are configured for a current serving cell of the terminal device, and a BWP deactivation timer is configured for a currently activated BWP, the method comprising:
    after receiving indication information, determining, by the terminal device, whether to stop, start, or adjust the BWP deactivation timer, the indication information being used for indicating the terminal device to activate or deactivate the non-dynamic scheduling resource;
    wherein determining whether to stop, start, or adjust the BWP deactivation timer comprises: determining to stop or adjust the BWP deactivation timer, in a case where the terminal device meets a first condition, wherein the first condition is a criterion used by the terminal device to determine whether to stop or adjust the BWP deactivation timer after acquiring the indication information;
    wherein determining to stop or adjust the BWP deactivation timer, in the case where the terminal device meets the first condition, comprises: determining to stop or adjust the BWP deactivation timer, in a case where the terminal device determines that the indication information is used for indicating the terminal device to activate the non-dynamic scheduling resource, and
    wherein determining to stop or adjust the BWP deactivation timer, in the case where the terminal device determines that the indication information is used for indicating the terminal device to activate the non-dynamic scheduling resource, comprises:
    determining to stop or adjust the BWP deactivation timer, in a case where the terminal device determines that a New Data Index (NDI) in hybrid automatic repeat request (HARQ) information of the PDCCH is 0, and the indication information is used for indicating the terminal device to activate the non-dynamic scheduling resource.

2. The method according to claim 1, wherein after receiving the indication information, determining, by the terminal device, whether to stop, start, or adjust the BWP deactivation timer, comprises:
    after receiving a Physical Downlink Control Channel (PDCCH) scrambled using a Configured Scheduling-Radio Network Temporary Identifier (CS-RNTI), determining, by the terminal device, whether to stop, start, or adjust the BWP deactivation timer, wherein the PDCCH is used for indicating the terminal device to activate or deactivate the non-dynamic scheduling resource.

3. The method according to claim 1, wherein after receiving the indication information, determining, by the terminal device, whether to stop, start, or adjust the BWP deactivation timer comprises:
    after receiving a Radio Resource Control (RRC) re-configuration message, determining, by the terminal device, whether to stop, start, or adjust the BWP deactivation timer, wherein the RRC re-configuration message comprises the indication information.

4. The method according to claim 1, wherein determining whether to stop, start, or adjust the BWP deactivation timer comprises:
    determining to start, restart, or adjust the BWP deactivation timer, in a case where the terminal device meets a second condition, wherein the second condition is a criterion used by the terminal device to determine whether to start, restart, or adjust the BWP deactivation timer after acquiring the indication information.

5. The method according to claim 4, wherein determining to start, restart, or adjust the BWP deactivation timer, in the case where the terminal device meets the second condition, comprises:
    determining to start, restart, or adjust the BWP deactivation timer, in a case where the terminal device determines that the indication information is used for indicating the terminal device to deactivate the non-dynamic scheduling resource.

6. The method according to claim 5, wherein determining to start, restart, or adjust the BWP deactivation timer, in the case where the terminal device determines that the indication information is used for indicating the terminal device to deactivate the non-dynamic scheduling resource, comprises:
    starting, or restarting the BWP deactivation timer, in a case where the terminal device determines that the New Data Index (NDI) in the hybrid automatic repeat request (HARD) information of the PDCCH is 0, and the indication information is used for indicating the terminal device to deactivate the non-dynamic scheduling resource.

7. The method according to claim 1, wherein the non-dynamic scheduling resource comprises at least one of following:
    a downlink non-dynamic scheduling resource on a paired spectrum, a downlink non-dynamic scheduling resource on a non-paired spectrum, and an uplink non-dynamic scheduling resource on the non-paired spectrum.

8. The method according to claim 1, wherein one of the following:
    a default BWP is configured for the terminal device, and the currently activated BWP is a non-default BWP; and
    a default BWP is not configured for the terminal device, and the currently activated BWP is a non-initial BWP.

9. A terminal device, wherein a BWP and a non-dynamic scheduling resource are configured for a current serving cell of the terminal device, and a BWP deactivation timer is configured for a currently activated BWP, the terminal device comprising:
    a processor, a transceiver, and a memory, the memory being configured to store instructions, which when executed by the processor, causes the terminal device to:
    receive, by the transceiver, indication information; and
    determine, by the processor, whether to stop, start or adjust the BWP deactivation timer, after receiving the indication information by the transceiver, the indication information being used for indicating the terminal device to activate or deactivate the non-dynamic scheduling resource;

wherein the processor is configured to: determine to start, restart, or adjust the BWP deactivation timer, in a case of meeting a second condition, wherein the second condition is a criterion used by the terminal device to determine whether to start, restart, or adjust the BWP deactivation timer after acquiring the indication information;

wherein the processor is further configured to: determining to start, restart, or adjust the BWP deactivation timer, in a case of determining that the indication information is used for indicating the terminal device to deactivate the non-dynamic scheduling resource; and wherein the processor is further configured to: start, or restart the BWP deactivation timer, in a case of determining that the New Data Index (NDI) in the hybrid automatic repeat request (HARQ) information of the PDCCH is 0, and the indication information is used for indicating the terminal device to deactivate the non-dynamic scheduling resource.

10. The terminal device according to claim 9, wherein the processor is configured to:

after receiving, by the transceiver, a Physical Downlink Control Channel (PDCCH) scrambled using a Configured Scheduling-Radio Network Temporary Identifier CS-RNTI, determine whether to stop, start, or adjust the BWP deactivation timer, wherein the PDCCH is used for indicating the terminal device to activate or deactivate the non-dynamic scheduling resource.

11. The terminal device according to claim 9, wherein the processor is configured to:

after receiving a Radio Resource Control (RRC) re-configuration message by the transceiver, determine whether to stop, start, or adjust the BWP deactivation timer, wherein the RRC re-configuration message comprises the indication information.

12. The terminal device according to any one of claim 9, wherein the processor is configured to:

determine to stop or adjust the BWP deactivation timer, in a case of meeting a first condition, wherein the first condition is a criterion used by the terminal device to determine whether to stop or adjust the BWP deactivation timer after acquiring the indication information.

13. The terminal device according to claim 12, wherein the processor is further configured to:

determine to stop or adjust the BWP deactivation timer, in a case where the indication information is used for indicating the terminal device to activate the non-dynamic scheduling resource.

14. The terminal device according to claim 13, wherein the processor is further configured to:

determine to stop or adjust the BWP deactivation timer, in a case of determining that a New Data Index (NDI) in hybrid automatic repeat request (HARD) information of the PDCCH is 0, and the indication information is used for indicating the terminal device to activate the non-dynamic scheduling resource.

* * * * *